United States Patent [19]
Garbus et al.

[11] Patent Number: 5,848,249
[45] Date of Patent: *Dec. 8, 1998

[54] METHOD AND APPARATUS FOR ENABLING INTELLIGENT I/O SUBSYSTEMS USING PCI I/O DEVICES

[75] Inventors: Elliott Garbus, Scottsdale; Barry Davis, Chandler, both of Ariz.

[73] Assignee: Intel Corporation, Santa Clara, Calif.

[*] Notice: The term of this patent shall not extend beyond the expiration date of Pat. No. 5,734,847.

[21] Appl. No.: 893,413

[22] Filed: Jul. 11, 1997

Related U.S. Application Data

[63] Continuation of Ser. No. 490,775, Jun. 15, 1995, Pat. No. 5,734,847.

[51] Int. Cl.$^6$ .................................................. G06F 13/38
[52] U.S. Cl. ..................... 395/308; 395/310; 395/821; 395/309; 395/280; 395/287
[58] Field of Search ..................... 395/280, 281, 395/287, 306, 309, 750, 307, 310, 308, 821

[56] References Cited

U.S. PATENT DOCUMENTS

| | | | |
|---|---|---|---|
| 5,379,384 | 1/1995 | Solomon | 395/308 |
| 5,539,341 | 7/1996 | Shah et al. | 395/306 |
| 5,542,053 | 7/1996 | Bland et al. | 395/309 |
| 5,542,056 | 7/1996 | Jaff et al. | 395/280 |
| 5,548,730 | 8/1996 | Young et al. | 395/280 |
| 5,557,758 | 9/1996 | Bland et al. | 395/308 |
| 5,564,026 | 10/1996 | Amini et al. | 395/308 |
| 5,568,619 | 10/1996 | Blackledge et al. | 395/281 |
| 5,574,869 | 11/1996 | Young et al. | 395/306 |
| 5,586,268 | 12/1996 | Chen et al. | 395/250 |
| 5,594,882 | 1/1997 | Bell | 395/421.02 |
| 5,606,672 | 2/1997 | Wade | 395/308 |
| 5,613,057 | 3/1997 | Wade et al. | 395/287 |

*Primary Examiner*—Christopher B. Shin
*Attorney, Agent, or Firm*—Blakely, Sokoloff, Taylor & Zafman LLP

[57] ABSTRACT

An apparatus having a first interface for coupling to a first component bus; a second interface for coupling to a second component bus; an address translation unit coupled to the second interface; and a bus bridge coupled to the first interface and to the second interface. The bus bridge has a first configuration register for disabling an assertion by a first component coupled to the first interface of a component select signal on said second interface; a second configuration register for disabling a propagation by the bus bridge of a private address, contained in an address space which is private to the second interface, from the second interface to the first interface, and to disable a response by the bus bridge to the private address sent from the first interface; and a third configuration register in the address translation unit such that the address translation unit will translate the private address to a local system address in a local system address space, and also translate a local system address contained in the local system address space to the private address.

2 Claims, 8 Drawing Sheets

METHOD AND APPARATUS FOR ENABLING INTELLIGENT I/O SUBSYSTEMS USING PCI I/O DEVICES

This is a continuation of application Ser. No. 08/490,775, filed Jun. 15, 1995, now U.S. Pat. No. 5,734,847.

BACKGROUND OF THE INVENTION

1. Field of the Invention

The present invention relates to the field of use of computer system architecture. More particularly, the present invention relates to a mechanism and methods for implementing intelligent input/output subsystems in computer systems.

2. Background

Presently, computer systems employ a wide variety of peripheral components or input/output (I/O) devices. For example, a typical computer system usually contains a monitor, a keyboard, a mouse, a floppy drive, a network controller, a disk drive or an array of disk drives, and, optionally, a printer. High performance computer systems such as servers have more complex I/O device requirements.

Typically, a host processor of the computer system loads a software driver for each of the devices that the computer system is to support. These drivers are loaded into the memory of the system host processor and address space must be allocated to theses devices. In addition, in operation, these devices generate interrupts that contend for the processing time of the host processor. System performance suffers dramatically with an increase in the number of I/O devices that the host processor has to support. In addition, there is a loss of bandwidth on the bus due to I/O device interaction from loss bus utilization time due to movement of data and control signals in operation.

An example can be seen where the host processor of the computer system is connected to the I/O devices through a component bus defined by the Peripheral Component Interconnect (PCI) Local Bus Specification, Revision 2.0, published by the PCI Special Interest Group. During system initialization, the host processor loads a device driver for each PCI device on the PCI bus. During operation, the PCI bus is occupied each time a read or write transaction is occurring. The part of the host processor's processing time that is used in processing the interrupts generated by each PCI device is taken away from the total processing time of the host processor.

In high performance computer systems such as file and application servers, the time that a host processor spends processing I/O interrupts from PCI devices is considerable and drastically limits the time which the host processor can spend on mother computing tasks. This problem is exacerbated as more devices are added to the PCI bus, such as through the use of a PCI to PCI bridge following PCI to PCI Bridge Architecture Specification, Revision 1.0, for example. As the number of PCI devices connected to the PCI bus increases by the use of the PCI to PCI bridge, the host processor spends more and more time dealing with I/O transactions and, therefore, has less time to perform other functions.

SUMMARY

It is an object of the present invention to achieve higher levels of system performance by achieving higher levels of input/output (I/O) system performance.

It is another object of the present invention to off-load device interrupts from the host processor.

It is a further object of the present invention to allow concurrent I/O transactions over an I/O system bus.

These and other objects of the present invention are achieved through the use of private devices. Private devices are I/O devices that are hidden from the host processor. Private devices are created using an I/O processor which includes a local processor coupled to a local system bus; a local memory controller coupled to the local system bus that enables access to a memory from the local system bus; a bus bridge having a first bus interface coupled to a first component bus; a second bus interface coupled to a second component bus, the bus bridge including means for creating an address space which is private to the secondary component bus such that the bridge will not send any address found in the private address space to the primary component bus, the primary bus being a PCI bus with a lower bus number; and address translation means coupled to the local system bus and the bus bridge for translating addresses between the local system bus and the second component bus.

It is necessary to hide devices from the host processor so that the host processor does not load drivers for these devices, nor does the host processor allocate address space for these devices. Also, as the host processor is not aware of these private devices, it does not have to devote processing resources to any interrupts generated by these devices. By being able to hide these devices, complex I/O sub-systems can be built while keeping any processing demands on the host processor to a minimum. Also, by the use of private devices, transactions on both buses can occur concurrently. While the local processor is interfacing with a private device on the secondary bus, the primary bus traffic can occur such that the host can be talking to a device on a primary bus. The ability of the system to handle concurrent operations effectively doubles the number of transactions that can occur at the same time.

Other objects, features and advantages of the present invention will be apparent from the accompanying drawings, and from the detailed description that follows below.

BRIEF DESCRIPTION OF THE DRAWINGS

FIG. 3a–g illustrates three different embodiments of the I/O subsystem configured in accordance with the current invention.

DETAILED DESCRIPTION OF THE INVENTION

The present invention provides a method and apparatus for creating, configuring, and controlling input/output (I/O)

devices on a first component bus such that these I/O devices are not detectable by an intelligent agent located on a second component bus which is electrically isolated from but is logically connected to the first component bus. For purposes of explanation, specific embodiments are set forth to provide a thorough understanding of the present invention. However, it will be understood by one skilled in the art, from reading this disclosure, that the invention may be practiced without these details. Further, although the present invention is described through the use of system component buses that conform to the Peripheral Component Interconnect (PCI) Local Bus Specification, Revision 2.0, published by the PCI Special Interest Group, most, if not all, aspects of the invention apply to system component buses over which I/O processors can control I/O devices which are hidden from host processors. Moreover, well-known elements, devices, process steps and the like are not set forth in detail in order to avoid obscuring the present invention.

I. Terminology and Conventions

A. Representation of Numbers

All numbers in this document can be assumed to be base unless designated otherwise. In text and tables, numbers in base 16 are represented as "nnn$_H$" and numbers in base 2 are represented as "nnn$_2$", where the "H" signifies hexadecimal and "2" signifies binary. In pseudo code descriptions, hexadecimal numbers are represented in the form 0x1234ABCD. Binary numbers are also assumed when bit operations or bit ranges are used.

B. Fields

A preserved field in a data structure is one that the processor does not use. Preserved fields can be used by software; the processor will not modify such fields.

A reserved field is a field that may be used by an implementation. If the initial value of a reserved field is supplied by software, this value must be zero. Software should not modify reserved fields or depend on any values in reserved fields.

A read only field can be read to return the current value. Writes to read only fields are treated as no-op operations and will not change the current value nor result in an error condition.

A read/clear field can also be read to return the current value. A write to a read/clear field with the data value of 0 will cause no change to the field. A write to a read/clear field with a data value of 1 will cause the field to be cleared (reset to the value of 0). For example, if a read/clear field has a value of F0$_H$, and a data value of 55$_H$ is written, the resultant field will be A0$_H$.

C. Specifying Bit and Signal Values

The terms "set" and "clear" in this specification refer to bit values in register and data structures. If a bit is set, its value is "1"; if the bit is clear, its value is "0". Likewise, "setting" a bit means giving it a value of 01 and "clearing" a bit means giving it a value of "0".

The terms "assert" and "de-assert" refer to the logically active or inactive value of a signal or bit, respectively.

D. Signal Name Conventions

All signal names use the signal name convention of using the "#" symbol at the end of a signal name to indicate that the signal's active state occurs when it is at a low voltage. This includes processor related signal names that normally use an overline. The absence of the "#" on symbol indicates that the signal's active state occurs when it is at a high voltage.

E. Terminology

To aid the discussion of the I/O processor architecture, the following terminology is used:

Downstream . . . At or toward a PCI bus with a higher number (after configuration).

Upstream . . . At or toward a PCI bus with a lower number (after configuration).

DWORD . . . 32-bit data word.

Host processor . . . Processor located upstream from the I/O processor.

Local processor . . . The processor within the I/O processor.

Local bus . . . Local processor bus.

Local memory . . . Memory subsystem on the local processor's local bus.

Inbound . . . At or toward a local processor's local bus.

Outbound . . . At or toward a PCI bus.

F. Pin functions and names All pin functions and names conform to the PCI Local Bus Specification, Revision 2.0, published by the PCI Special Interest Group, except as noted below. In the discussion that follows, the preferred embodiment involves the use of a primary PCI bus and a Ad secondary PCI bus. Consequently, the terms "P__" and "S__" will to prepended to the names of a pin or a set of pins corresponding to the primary PCI bus and the secondary PCI bus, respectively. For example, P_AD[31:00] represents the address and data lines on the primary PCI bus while S_AD [31:00] represents the address and data lines on the secondary PCI bus, respectively.

II. System Overview

Figure 1:
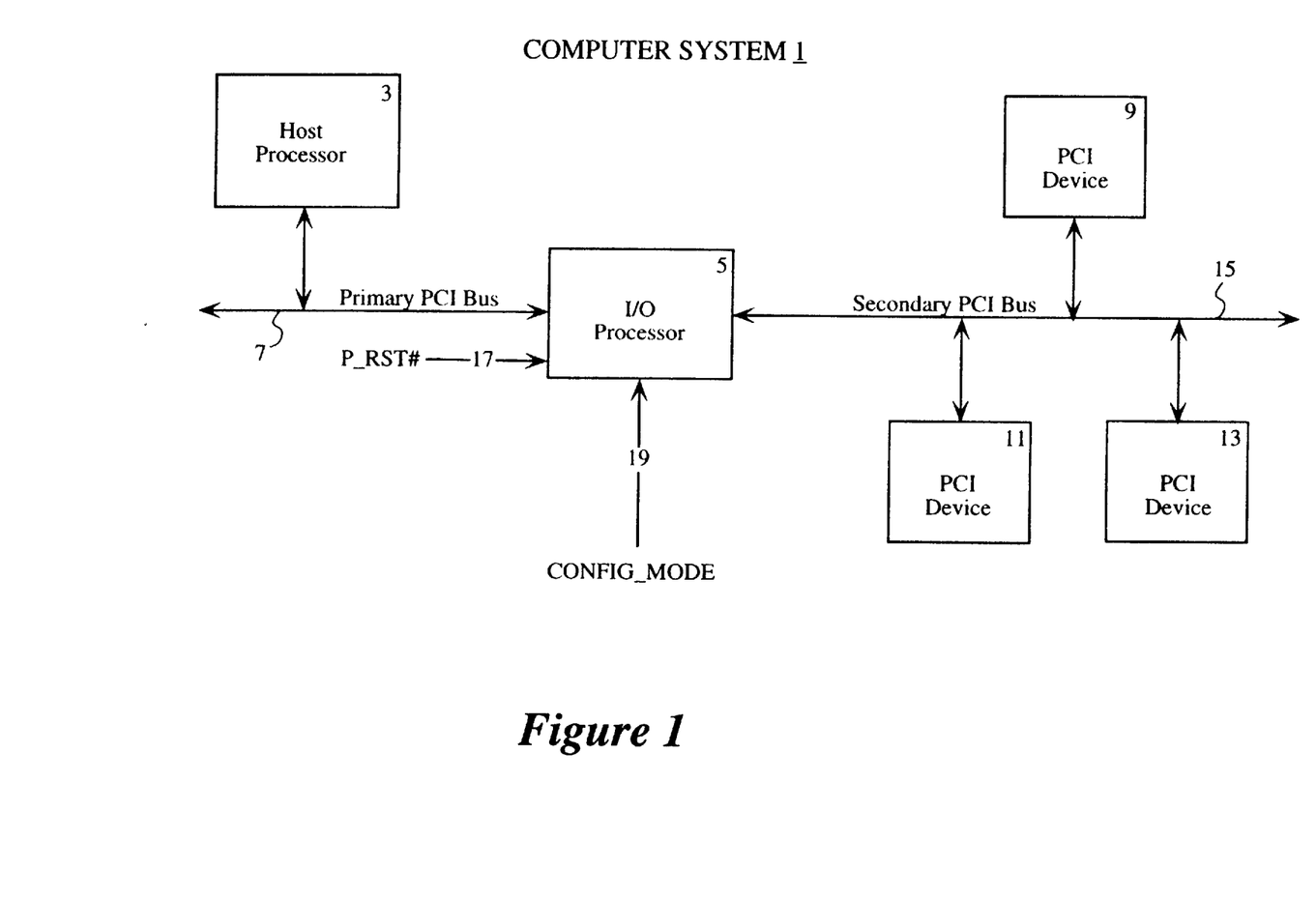
FIG. 1 is a block diagram of a computer system containing an I/O processor for creating an I/O subsystem configured in accordance with one embodiment of the current invention.

FIG. 1 illustrates a computer system 1 containing one embodiment of the present invention. A host processor 3 is connected to and communicates with an input/output (I/O) processor through a primary PCI bus 7. I/O processor 5 is connected to and communicates with a PCI device 9, a PCI device 11, and a PCI device 13 through the use of a secondary PCI bus 15.

Host processor 3 contains elements that are typically found in most general purpose computers and almost all special purpose computers. In fact, the several elements contained within most processor 3 are intended to be representative of this broad category of data processors. In one example, host processor 3 can contain a microprocessor and a main memory. In another example, host processor 3 can contain more than one microprocessor, a main memory and a cache memory.

PCI devices 9, 11 and 13 are intended to represent any PCI device that conforms with the PCI Local Bus Specification, Revision 2.0. For example, PCI device 9 can be a Small Computer Systems Interface (SCSI) drive controller, PCI device 11 can be an Ethernet network controller, and PCI device 13 can be a VGA card.

Figure 2:
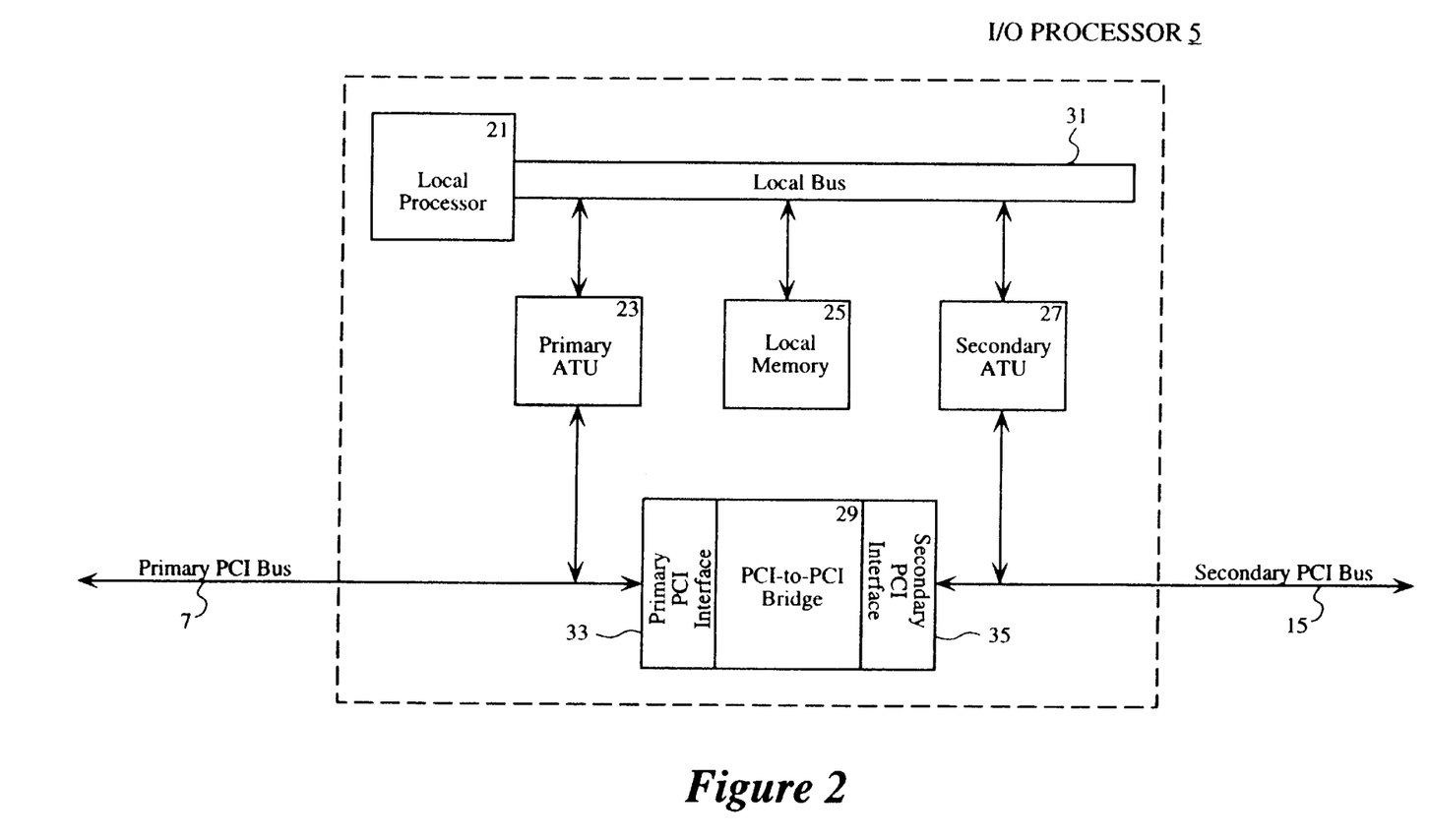
FIG. 2 is a block diagram of one embodiment of the I/O processor configured in accordance with the current invention.

FIG. 2 is a block diagram of an embodiment of I/O processor 5 of the present invention. I/O processor 5 comprises a local processor 21, a primary address translation unit (ATU) 23, a local memory 25, a secondary ATU 27, and a PCI-to-PCI bridge (bridge) 29. Local processor 21, primary ATU 23, local memory 25 and secondary ATU 27 are connected and communicate through the use of a local system bus (local bus) 31. Bridge 29 further includes a primary PCI interface 33 and a secondary PCI interface 35 that connects bridge 29 to primary PCI bus 7 and secondary PCI bus 15, respectively. Primary ATU 23 and bridge 29 are connected to and communicate through the use of primary PCI bus 7. Secondary ATU 27 and bridge 29 are connected to and communicate through the use of secondary PCI bus 15. Both primary PCI bus 7 and secondary PCI bus 15 are independent PCI buses that conform to the PCI Local Bus Specification, Revision 2.0, published by the PCI Special Interest Group.

Local processor 21 is intended to represent a general purpose computer processor. In the preferred embodiment, local processor 21 operates out of its own 32-bit address space and not PCI address space. A processor that can be used is the 80960 JF microprocessor from Intel Corporation.

Bridge 29 connects the two independent PCI buses and allows certain bus transactions on one PCI bus to be forwarded to the other PCI bus. Bridge 29 also allows fully independent PCI bus operation, including independent clocks. Bridge 29 in I/O processor 5 is fully compliant with the PCI to PCI Bridge Architecture Specification, Revision 1.0 published by the PCI Special Interest Group. Bridge 29 has a set of configuration registers that is accessible through primary PCI bus 7.

Local memory 25 is intended to represent a broad category of memory such as DRAM, SRAM and Flash Memory. Local memory 25 also contains logic circuitry required to access any memory circuitry contained in local memory 25. Local memory 25 stores executable code and other data used in the operation of local processor 21. Access is accomplished through regular memory-format instructions from local processor 21. In addition, as described below, local memory 25 contains all configuration registers of primary ATU 23, secondary ATU 27 and bridge 29 as memory-mapped registers. Each of these registers is accessed as a memory-mapped 32-bit register with a unique memory address. Alternatively, instead of using memory-mapped registers, the configuration registers of bridge 29 can be contained inside bridge 29 as hardware registers. Similarly, the memory-mapped configuration registers of primary ATU 23 and secondary ATU 27 can also be hardware registers contained in primary ATU 23 and secondary ATU 27, respectively. Further, if the configuration registers were contained in each respective device, then primary ATU 23 would not be necessary in the configuration of bridge 29 and secondary ATU 27.

III. Private PCI Devices

Still referring to FIG. 2, Type 1 commands received by primary PCI interface 33 of bridge 29 are converted to Type 0 commands by bridge 29 to configure PCI devices connected to secondary PCI interface 35. The operation and use of the 32-bit Type 1 and Type 0 PCI configuration commands are as defined in the PCI Local Bus Specification, Revision 2.0 and will not be discussed in detail.

Private PCI Devices Using S_AD[15:11]

In default operation of the present invention, a unique encoding in primary addresses P_AD[15:11] in a Type 1 command received on primary PCI interface 33 of bridge 29 results in the assertion of one bit in secondary addresses S_AD[31:16] in a Type 0 command on secondary PCI bus 15 during the Type 1 to Type 0 conversion by bridge 29 as shown in Table 1, below.

TABLE 1

IDSEL Mapping for Type 1 to Type 0 Conversions

| Primary Address P_AD[15:11] | | Secondary Address Bits D_AD[31:11] | | | | | |
|---|---|---|---|---|---|---|---|
| 15 | 11 | 31 | 27 | 23 | 19 | 15 | 11 |
| \| | \| | \| | \| | \| | \| | \| | \| |
| 0000 | $0_2$ | 0000 | 0000 | 0000 | 0001 | 0000 | $0_2$ |
| 0000 | $1_2$ | 0000 | 0000 | 0000 | 0010 | 0000 | $0_2$ |
| 0001 | $0_2$ | 0000 | 0000 | 0000 | 0100 | 0000 | $0_2$ |
| 0001 | $1_2$ | 0000 | 0000 | 0000 | 1000 | 0000 | $0_2$ |
| 0010 | $0_2$ | 0000 | 0000 | 0001 | 0000 | 0000 | $0_2$ |
| 0010 | $1_2$ | 0000 | 0000 | 0010 | 0000 | 0000 | $0_2$ |
| 0011 | $0_2$ | 0000 | 0000 | 0100 | 0000 | 0000 | $0_2$ |

TABLE 1-continued

IDSEL Mapping for Type 1 to Type 0 Conversions

| Primary Address P_AD[15:11] | | Secondary Address Bits D_AD[31:11] | | | | | |
|---|---|---|---|---|---|---|---|
| 15 | 11 | 31 | 27 | 23 | 19 | 15 | 11 |
| \| | \| | \| | \| | \| | \| | \| | \| |
| 0011 | $1_2$ | 0000 | 0000 | 1000 | 0000 | 0000 | $0_2$ |
| 0100 | $0_2$ | 0000 | 0001 | 0000 | 0000 | 0000 | $0_2$ |
| 0100 | $1_2$ | 0000 | 0010 | 0000 | 0000 | 0000 | $0_2$ |
| 0101 | $0_2$ | 0000 | 0100 | 0000 | 0000 | 0000 | $0_2$ |
| 0101 | $1_2$ | 0000 | 1000 | 0000 | 0000 | 0000 | $0_2$ |
| 0110 | $0_2$ | 0001 | 0000 | 0000 | 0000 | 0000 | $0_2$ |
| 0110 | $1_2$ | 0010 | 0000 | 0000 | 0000 | 0000 | $0_2$ |
| 0111 | $0_2$ | 0100 | 0000 | 0000 | 0000 | 0000 | $0_2$ |
| 0111 | $1_2$ | 1000 | 0000 | 0000 | 0000 | 0000 | $0_2$ |
| 1XXX | $X_2$ | 0000 | 0000 | 0000 | 0000 | 0000 | $0_2$ |

X = Don't Care

Figure 3A:
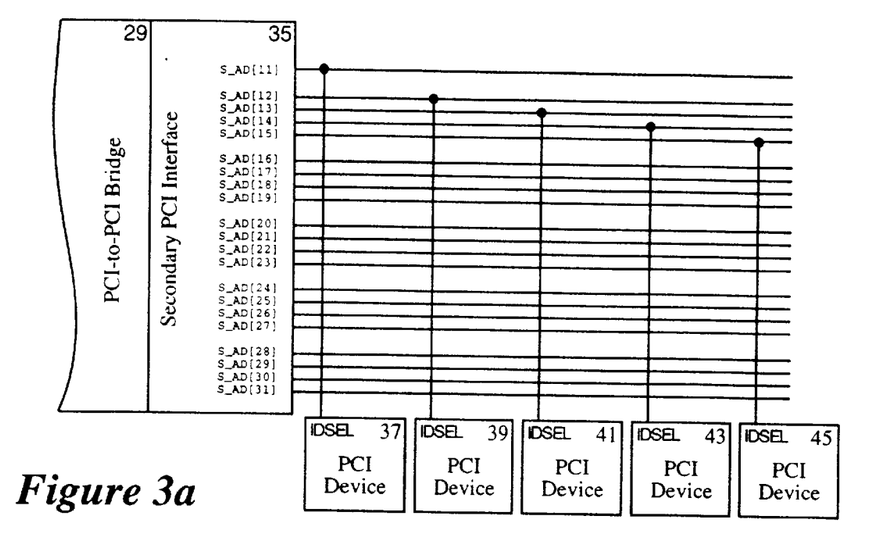

It will be appreciated that no encoding of P_AD[15:11] on primary PCI interface 33 will assert bits S_AD[15:11] on secondary PCI interface 35. In other words, no intelligent agent which is attached to primary PCI interface 33 of bridge 29 can configure a PCI device on the secondary PCI bus 15 if the PCI device has its IDSEL line attached to any one of the bits of S_AD[11]. For example, FIG. 3a illustrates five PCI devices 37, 39, 41, 43 and 45 that have their IDSEL lines tied to S_AD[11], S_AD[12], S_AD[13], S_AD[14] and S_AD[15], respectively. Each of PCI devices 37, 39, 41, 43 and 45 are private and only secondary ATU 27 will be able to send Type 0 configuration commands to them. In most operations, Local processor 21 can access the private device only through the use of secondary ATU 27.

Thus, in Type 1 to Type 0 conversions, P_AD[15:11] are decoded to assert a unique address line only from S_AD[31:16] on secondary PCI interface 35 as described above. This leaves S_AD[15:11] on secondary PCI interface 35 open for up to 5 address lines for IDSEL assertion of private PCI devices. These 5 address lines shall be reserved for private PCI devices on secondary PCI bus 15 and any PCI device that has its IDSEL connected to any one of S_AD[15:11] will automatically become a private PCI device.

Private PCI Devices Using SISR 75 and S_AD[20:16]

Figure 4:
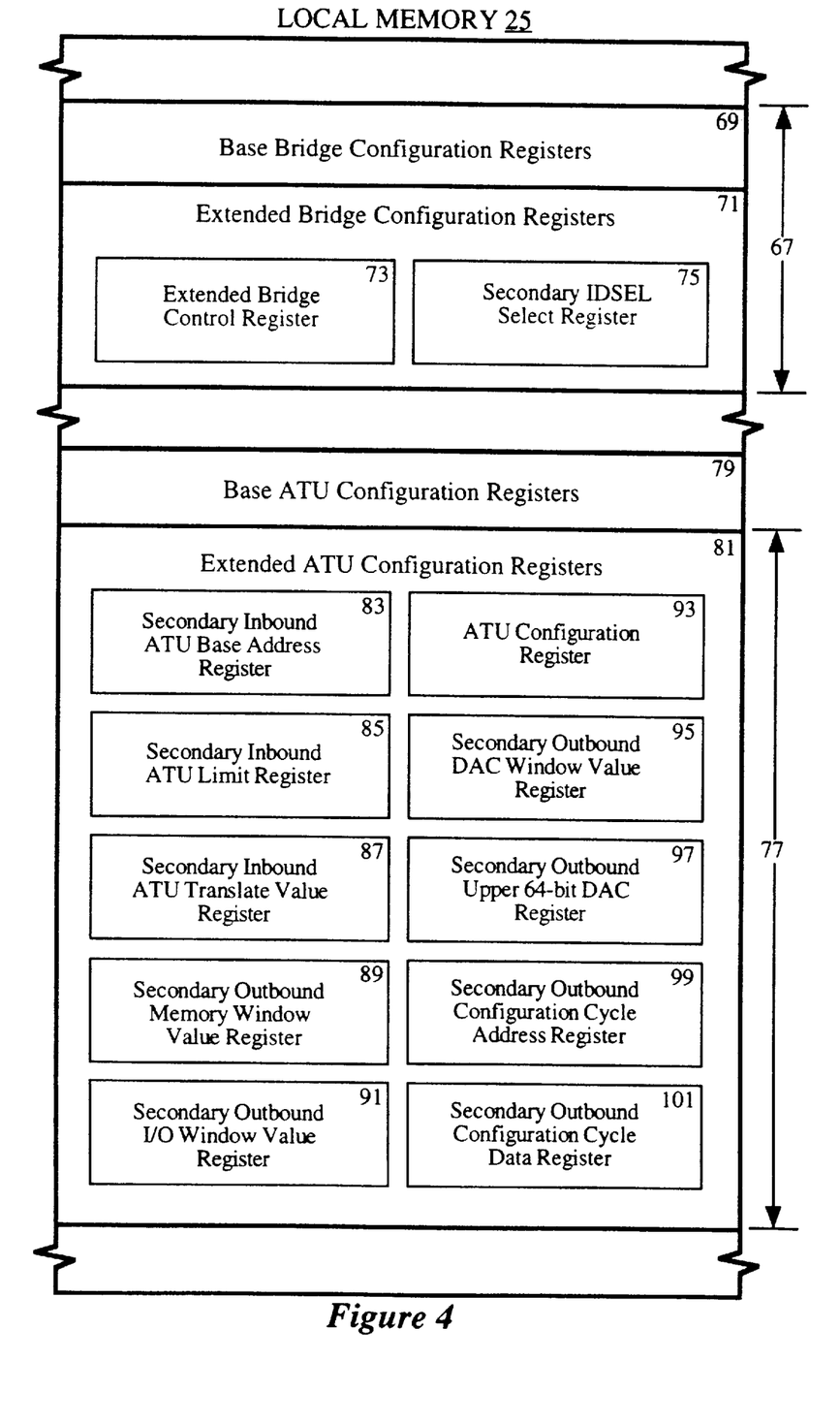
FIG. 4 illustrates a portion of a local memory contained in the I/O processor which contains a memory-mapped register summary of all configuration registers of a PCI to PCI bus bridge and two address translation units.

FIG. 4 illustrates a portion of local memory 25 which has a memory-mapped register summary of all configuration registers 67 of bridge 29. A set of base bridge configuration registers 69 includes all the registers defined by the PCI to PCI Bridge Architecture Specification, Revision 1.0. In addition, a set of extended bridge configuration registers 71 includes two additional registers: (1) an Extended Bridge Control Register (EBCR) 73 and (2) a Secondary IDSEL Control Register (SISR) 75.

EBCR 73 contains a Configuration Cycle Disable bit that will cause primary PCI interface 33 of bridge 29 to respond to all configuration cycles with a Retry condition until the Configuration Cycle Disable bit is cleared. In other words, configuration commands will only be accepted on primary PCI interface 33 if the Configuration Cycle Disable bit within the EBCR 73 is cleared. If the Configuration Cycle Disable bit is set, primary PCI interface 33 will signal a Retry on all PCI cycles, including Type 1 and Type 0 configuration commands.

Bits [4:0] of SISR 75 control the usage of masking bits in the conversion of Type 1 PCI configuration commands to Type 0 PCI configuration commands from primary PCI interface 33 to secondary PCI interface 35 for the creation of private PCI devices. The functioning of SISR 75 in the creation of private PCI devices is detailed further below.

If more than 5 unique address lines are required, SISR 75 can be configured to block secondary addresses S_AD [20:16] from being asserted after a conversion of a Type 1 command received on primary PCI interface 33 to a Type 0 conversion on secondary PCI interface 35. By setting the appropriate bits in SISR 68, bits 4, 3, 2, 1 or 0 for S_AD[20], SLAD[19], S_AD[18], S_AD[17] or S_AD [16], respectively, the associated address line can be forced to remain deasserted for any P_AD[15:11] encoding of $00000_2$ to $00100_2$ and therefore is free to be used as an IDSEL select line for private PCI devices. Table 2, below, shows the possible configurations of S_AD[31:11] for private Type 0 commands on the secondary interface. For example, if SISR 75 bit 0 is set, S_AD[16] will never be asserted during a Type 1 to Type 0 conversion as bridge 29 will, by using SISR 75 as a mask, force S_AD[16] to zero on the secondary PCI interface 35. Bridge 29 will perform the Type 1 to Type 0 conversion but not assert the reserved S_AD address line. The Type 0 command will then be ignored on secondary PCI bus 15. The device with its IDSEL line attached to S_AD[16] can only be accessed by secondary ATU 27.

TABLE 2

Private PCI Memory IDSEL Select Configurations

| Secondary Addresses S_AD[31:11] | | | | | | Secondary IDSEL Select Register (SISR) Bits 4–0 | | Use |
|---|---|---|---|---|---|---|---|---|
| 31 | 27 | 23 | 19 | 15 | 11 | 4 | 0 | |
| 0000 | 0000 | 0000 | 0000 | 0000 | $1_2$ | XXXX | $X_2$ | Already reserved for private PCI Devices |
| 0000 | 0000 | 0000 | 0000 | 0001 | $0_2$ | XXXX | $X_2$ | |
| 0000 | 0000 | 0000 | 0000 | 0010 | $0_2$ | XXXX | $X_2$ | |
| 0000 | 0000 | 0000 | 0000 | 0100 | $0_2$ | XXXX | $X_2$ | |
| 0000 | 0000 | 0000 | 0000 | 1000 | $0_2$ | XXXX | $X_2$ | |
| 0000 | 0000 | 0000 | 0001 | 0000 | $0_2$ | XXXX | $1_2$ | Can be used for private PCI devices only if the associated bit in SISR is set |
| 0000 | 0000 | 0000 | 0010 | 0000 | $0_2$ | XXX1 | $X_2$ | |
| 0000 | 0000 | 0000 | 0100 | 0000 | $0_2$ | XX1X | $X_2$ | |
| 0000 | 0000 | 0000 | 1000 | 0000 | $0_2$ | X1XX | $X_2$ | |
| 0000 | 0000 | 0001 | 0000 | 0000 | $0_2$ | 1XXX | $X_2$ | |

X = Don't Care

Figure 3B:
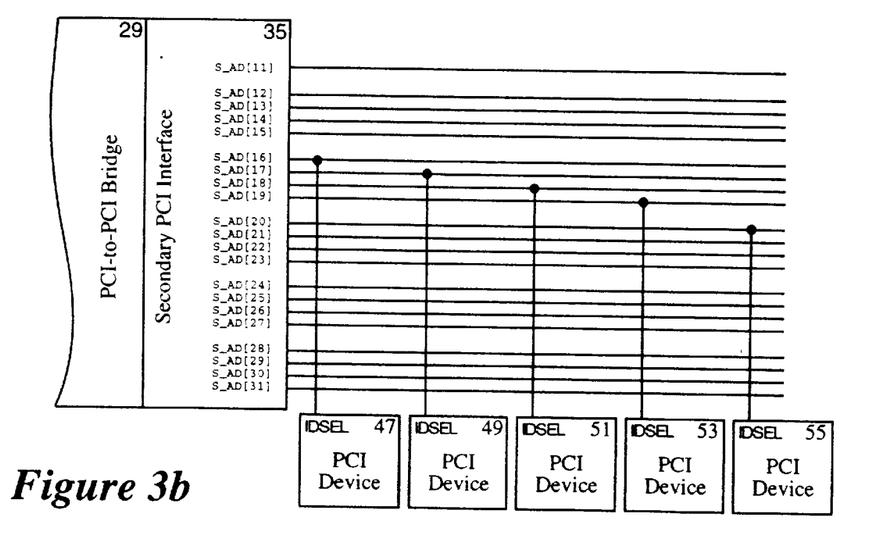

Referring to FIG. 3b, where PCI devices 47, 49, 51, 53 and 55 have their IDSEL lines attached to S_AD[16], S_AD[17], 5 S_AD[18], S_AD[19] and S_AD[20], respectively, and following the example above, if only bit 0 of SISR 75 is set and bits [4:1] of SISR 75 are clear, only PCI device 47 would be a private PCI device. S_AD[17], S_AD[18], S_AD[19] and S_AD[20] can be accessed by a Type 1 configuration command asserting P_AD[15:11] equal to $00001_2$, $00010_2$, $00011_2$ and $00100_2$, respectively. Similarly, if it was desired to make PCI device 51 a private PCI device, PCI device 51 being attached to S_AD[18], bit [2] of SISR 75 should be set. If it was desired to make PCI devices 47, 49, 51, 53 and 55 all be private devices, bits [4:0] of SISR 75 would all be set, thereby masking any assertion of the IDSEL lines of PCI devices 47, 49, 51, 53 and 55 on a Type 1 to Type 0 conversion by bridge 29. Therefore, by using SISR 75 and the 5 reserved address lines, a total of 10 IDSEL signals are available for private PCI devices.

Figure 3C:
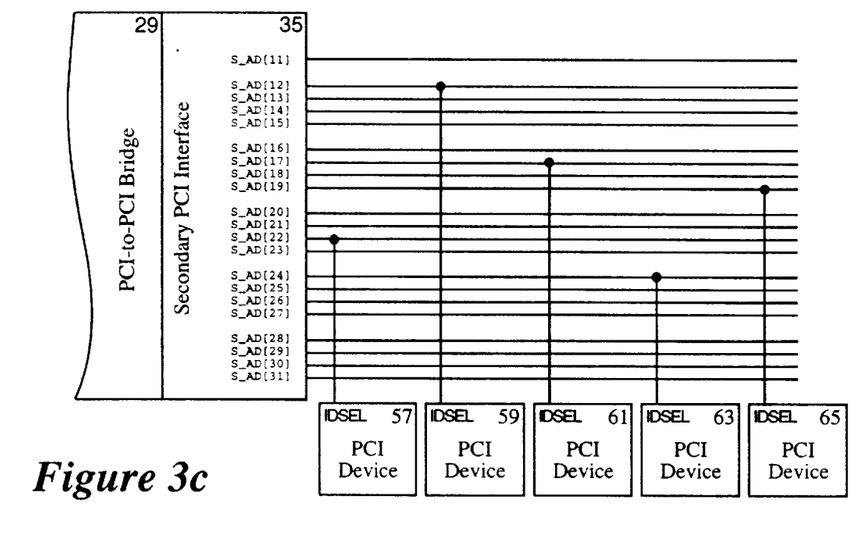

Referring to FIG. 3c, where PCI devices 57, 59, 61, 63 and 65 have their IDSEL lines attached to S_AD[22], S_AD[12], S_AD[17], S_AD[24] and S_AD[1], respectively, there could be a maximum of three private PCI devices and a minimum of one private PCI device. To achieve the maximum of three private PCI devices, bits [1] and [3] of SISR 75 would be set to make PCI devices 59 and 65, respectively, private. PCI device 59 is made private by attaching it to S_AD[12] as discussed above.

In the current invention, a PCI device is made private by either (1) attaching the PCI device's IDSEL line to S_AD [15:11], or (2) by attaching the PCI device's IDSEL line to S_AD[20:16] and programming the appropriate bit in SISR 75. As previously discussed, Type 0 configuration commands that are generated by conversion from Type 1 configuration messages can never assert any bits of S_AD [15:11]. Programming SISR 75 will selectively suppress the assertion of S_AD[20:16] on the conversion of Type 1 to Type 0 configuration commands. Either mechanism ensures that no intelligent agent on primary PCI bus 7, including host processor 3, will be able to detect any device that has been made private.

IV. Private Address Spaces

As discussed above, I/O processor 5 can create PCI devices that can use the secondary PCI bus yet avoid detection by host processor 3. At initialization, these private devices are hidden from host processor 3 because they do not respond to PCI configuration cycles generated by host processor 3. These private devices can be configured by secondary ATU 27 through normal PCI configuration cycles. I/O processor 5 can also support and control these private PCI devices through the use of secondary ATU 27. In addition, these private devices would be accessible by other PCI devices, both private and non-private, on secondary PCI bus 15. The private devices are accessed by the use of a private address space, as explained below.

Creation of Private Address Spaces

Figure 5:
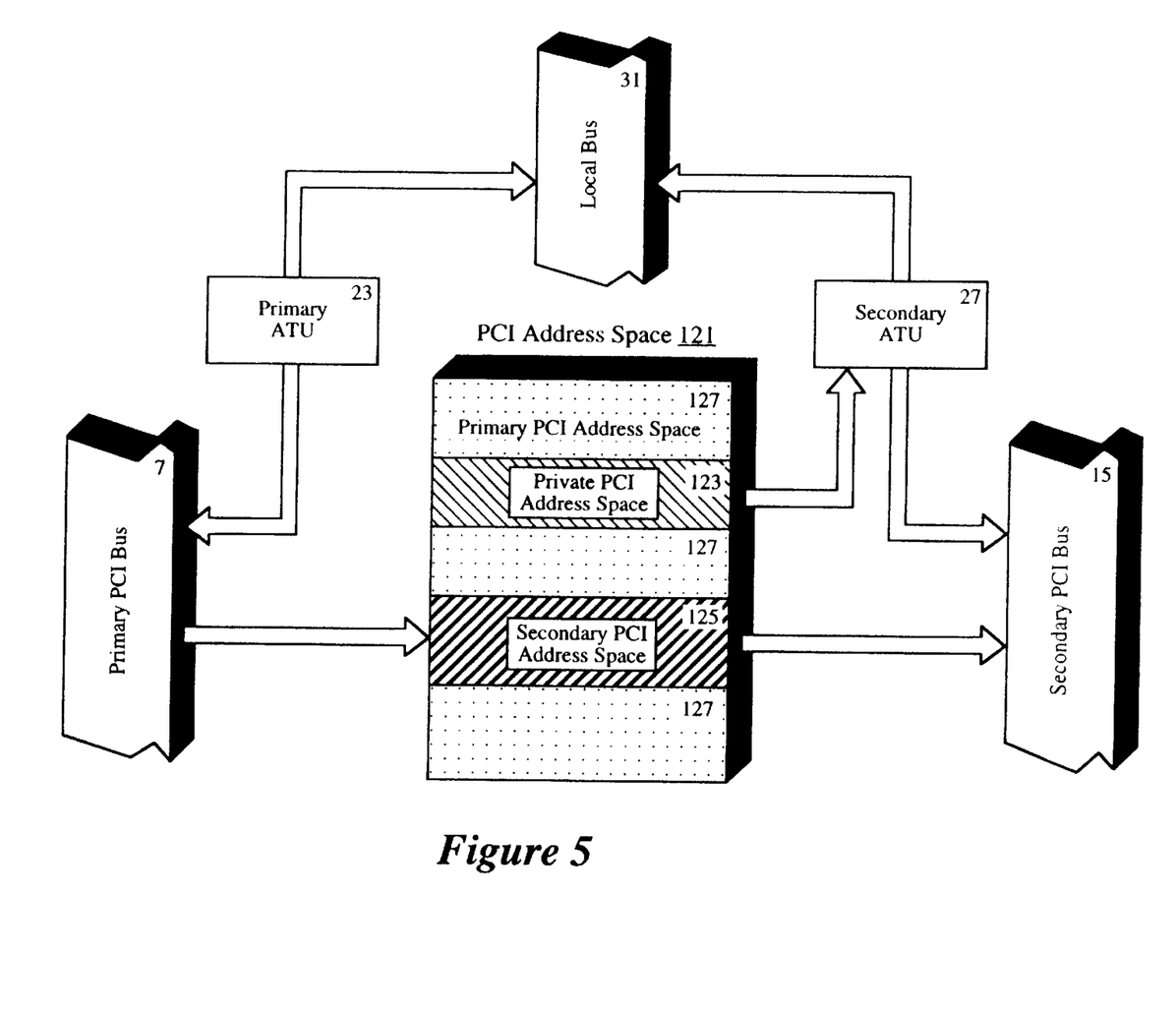
FIG. 5 illustrates a PCI address space configured to have a primary PCI address space, a secondary PCI address space and private PCI address space.

FIG. 5 illustrates a PCI address space 121 configured to have a private PCI address space 123, a secondary PCI address space 125 and a primary PCI address space 127. Normally, addresses generated on the primary PCI bus which are within the secondary PCI address space are transferred downstream to the secondary PCI bus by a PCI-to-PCI bridge. Also, a PCI-to-PCI bridge will forward all addresses that are not mapped to a secondary PCI address space from the secondary PCI bus to the primary PCI bus. In the present invention, secondary PCI interface 35 of bridge 29 implements private PCI address space 123 for private PCI devices on secondary PCI bus 15 where bridge 29 ignores and DOES_NOT forward a range of primary addresses received on secondary PCI interface 35 to primary PCI interface 33. Private PCI address space 123 is defined at configuration time by local processor 21.

In operation, on secondary PCI bus 15, private devices utilize private PCI address space 123 that is not available to any intelligent agent on primary PCI bus 7, including host processor 3. This private address space is defined as a set of primary addresses NOT forwarded upstream through bridge 29.

In addition, the addresses contained in private PCI address space 123—which are primary addresses—can still be used by PCI agents on primary PCI bus 7 to addressing devices on primary PCI bus 7 as bridge 29 will not forward primary addresses received on primary PCI interface 33 to secondary PCI bus 15. Therefore, by creating private PCI address space, the present invention also allows more primary addresses to be conserved for use by devices on primary PCI bus 7. Also, devices on secondary PCI bus 15 can use private PCI address space 123 to perform peer-to-peer transactions with no bandwidth implications to primary PCI bus 7. Similarly, devices on primary PCI bus 7 can use the addresses contained in private PCI address space 123 to address other devices on primary PCI bus 7.

Continuing to refer to FIG. 5 and referring again to FIG. 2, Primary ATU 23 and secondary ATU 27 allows PCI transactions direct access to local memory 25. Also, local processor 21 has direct access to the both primary PCI bus 7 and secondary PCI bus 15 through the use of primary ATU 23 and secondary ATU 27, respectively. Address translation is provided for transactions between PCI address space 121 and local processor address space (not shown), both of which are 4 gigabytes in size. As discussed below, address translation is controlled through programmable configuration registers which are accessible from both the PCI interface and local processor 21 and which allow flexibility in mapping the two address spaces.

Referring again to FIG. 4, another portion of local memory 25 has another memory-mapped register summary of all configuration registers 77 of primary ATU 23 and secondary ATU 27. A read or write to one of these registers returns data from the PCI bus and not from the register itself. A set of base ATU configuration registers 79 includes all the registers defined by PCI Local Bus Specification, Revision 2.0. In addition, a set of extended ATU configuration registers 81 includes ten additional registers for creating private PCI address space 123:

(1) Secondary Inbound ATU Base Address Register (SIABAR) 83;
(2) Secondary Inbound ATU Limit Register (SIALR) 85;
(3) Secondary Inbound ATU Translate Value Register (SIATVR) 87;
(4) Secondary Outbound Memory Window Value Register (SOMWVR) 89;
(5) Secondary Outbound I/O Window Value Register (SOIOWVR) 91;
(6) ATU Configuration Register (ATUCR) 93;
(7) Secondary Outbound DAC Window Value Register (SODWVR) 95;
(8) Secondary Outbound Upper 64-bit DAC Register (SOUDR) 97;
(9) Secondary Outbound Configuration Cycle Address Register (SOCCAR) 99; and
(10) Secondary Outbound Configuration Cycle Data Register (SOCCDR) 101.

SIABAR 83, SIALR 85, and SIATVR 87 are used in inbound address translations. SIABAR 83 contains the address of the base of a secondary inbound window on secondary PCI bus 15. SIALR 85 contains the value of the length from the base of the secondary inbound window that defines the size of the window. Any PCI address from PCI address space 121 which falls within the range defined by the base and the length of the secondary inbound window will be translated to an address in local processor address space.

SIATVR 87 contains the value used in the translation of an inbound PCI cycle on secondary PCI bus 15. The translation of the inbound PCI address follows the formula:

Local_address=(PCI_address AND NOT(Limit_Register))

OR

Translate_Value_Register, where PCI_address is an address in PCI address space 121; Limit Register is the value contained in SIALR 85; Translate_Value_Register is the value contained in SIATVR 87; and, Local_address is the PCI address translated to an address in local address space inside local processor 21.

SOMWVR 89 contains the value used in the translation of an outbound memory cycle to secondary PCI bus 15. Use of SOMWVR 89 will create the translated address from a secondary outbound memory window.

SOIOWVR 91 contains the value used in the translation of an outbound I/O cycle to secondary PCI bus 15. Use of SOIOWR 91 will create the translated address from the secondary outbound memory window if a private device is I/O mapped and not memory mapped.

ATUCR 93 contains the following bits: a Secondary ATU PCI Error Interrupt Enable bit, a Direct Addressing Enable bit, a Secondary PCI Boot Mode Enable bit, a Secondary Direct Addressing Select bit, and a Secondary Outbound Enable bit.

Secondary ATU PCI Error Interrupt Enable bit acts as a mask for bits [4:0] of the Secondary ATU Interrupt Status Register (SATUISR) (not shown), which is a register that is used to notify local processor 21 of the source of a secondary ATU 27 error interrupt. In addition, SATUISR is written to clear the source of the interrupt. Setting the Secondary ATU PCI Error Interrupt Enable bit will enable an interrupt to local processor 21 when any of bits [4:0] is set in the SATUISR. Clearing the Secondary ATU PCI Error Interrupt Enable bit will disable the interrupt.

If Secondary PCI Boot Mode Enable bit is set, the secondary ATU will claim all local bus accesses with addresses in the range: FE000000$_H$ to FFFFFFFF$_H$. This allows the local processor 21 to boot from secondary PCI bus 15. The translation algorithm will use SOMWVR 89 in this mode.

Direct Addressing Enable bit, if set, will enable direct addressing through the ATUs. Local bus cycles with an address between 0000.1000$_H$ and 07FFF.FFFF$_H$ will automatically be forwarded to the PCI bus with no address translation. The ATU which claims the direct addressing transaction is dependent on the state of the Secondary Direct Addressing Select bit. Secondary Direct Addressing Select, if set, will result in direct addressing outbound transactions to be forwarded through secondary ATU 27 to secondary PCI bus 15. When clear, direct addressing uses the primary ATU 23 and primary PCI bus 7. The Direct Addressing Enable bit must be set to enable direct addressing.

Secondary Outbound ATU Enable, if set, enables the secondary outbound translation function of secondary ATU 35. Clearing disables the secondary outbound translation function of secondary ATU 35.

SODWVR 95 contains the value used in the translation of an outbound DAC memory cycle to the secondary PCI bus. This is the window through which local processor 21 will read to or write from a private device if it is mapped into 64-bit address space.

SOUDR 97 contains the upper 32 bits of an outbound ATU DAC cycle which are untranslated.

SOCCAR 99 is used within the port programming model that is used by local processor 21 to configure devices on secondary bus 16. Local processor 21 will write the Type 0 configuration cycle address and then read from or write the to SOCCDR 101. SOCCDR 101 will initiate the cycle on secondary PCI bus 15 with the data from the cycle.

V. Creating Private Devices

Figure 6:
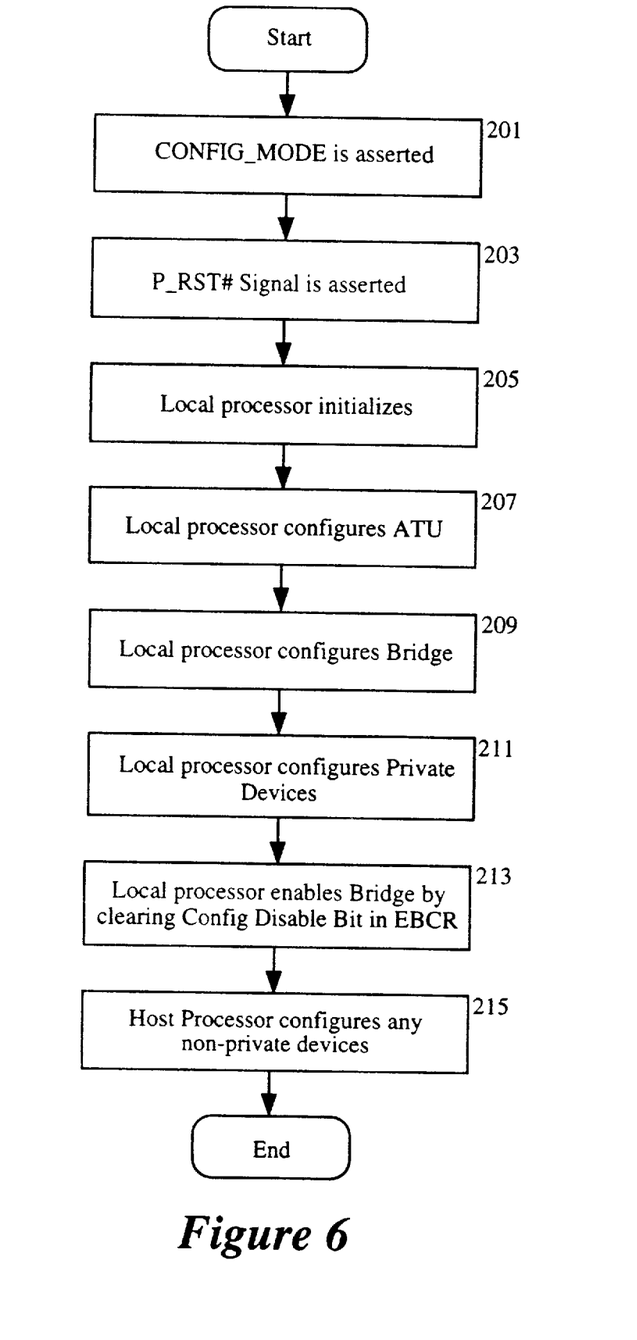
FIG. 6 is a flow diagram illustrating a method of creating the I/O subsystem using one embodiment of the I/O processor of the current invention.

FIG. 6 is a flow diagram illustrating a method for creating private PCI devices using an embodiment of the present invention. Reference will be made to the elements contained in FIGS. 1 and 2 when discussing FIG. 6.

In block 201, and referring to FIG. 1, in the preferred embodiment, CONFIG_MODE 19 is designed to be a hardware strap option sampled on the assertion of P_RST#

17. If CONFIG_MODE 19 is asserted when P_RST# 17 goes high, then the Configuration Cycle Disable bit of EBCR 73 is set. If CONFIG_MODE 19 is not asserted when P_RST#17 goes high, then the Configuration Cycle Disable bit is cleared.

In block 203, the value of CONFIG_MODE 19 signal pin which has been set, is written to Configuration Cycle Disable bit of EBCR 73 of bridge 29 when P_RST# 17 signal pin is asserted. When Configurations Cycle Disable bit of EBCR 73 is set, bridge 29 will not respond to any configuration cycles initiated by host processor 3.

In block 205, local processor 21 of I/O processor 5 goes through an initialization process. This initialization process is intended to be representative of the initialization process performed by all general computer processors. An example of the required procedures can be found in i960 Jx Microprocessor User's Manual, Order Number: 272483-001, Intel Corporation.

In block 207, local processor 21 of I/O processor 5 configures secondary ATU 27 by setting extended ATU configuration registers such that secondary ATU 27 will claim the addresses which are to be made private to local bus 31 and thereby preventing bridge 29 from forwarding them upstream to primary PCI bus 7.

In block 209, local processor 21 of I/O processor 5 configures additional configuration registers 71 of bridge 29. If private devices are to be created by the use of attaching the IDSEL of PCI devices to any one of S_AD[20:16], as described above, then local processor 21 will have to set the appropriate bit or bits of SISR 75 before continuing. Thus, SISR 75 must be programmed with the proper value to mask the appropriate bits in S_AD[20:16] before host processor 3 is allowed access to devices on secondary PCI bus 15 and probes secondary PCI bus 15 with Type 1 configuration commands.

In block 211, local processor 21 of I/O processor 5 configures any private PCI devices that have been created. The nature of the configuration of any private PCI device necessarily depend on which type of device is chosen for computer system 1. It will be appreciated that because private PCI devices are implemented by using any PCI device chosen from the general category of PCI devices, the operation and functions of which are well known, the actual details revolving around the configuration of any private devices by local processor 21 need not be discussed in detail.

In block 213, local processor 21 of I/O processor 5 clears Configuration Cycle Disable bit of EBCR 73, thereby allowing bridge 29 to respond to any configuration commands from host processor 3.

In block 215, I/O processor 5 has finished its initialization process and now is ready to accept configuration commands from host processor 3. When CONFIG_MODE 19 and P_RST#17 were asserted, I/O processor 5 started signaling a Retry on all PCI configuration cycles it received on primary PCI bus 7. After Configuration Cycle Disable bit of EBCR 73 is cleared, host processor 3 can configure any public devices on secondary PCI bus 15, including base configuration registers 69 of bridge 29.

Figure 7:
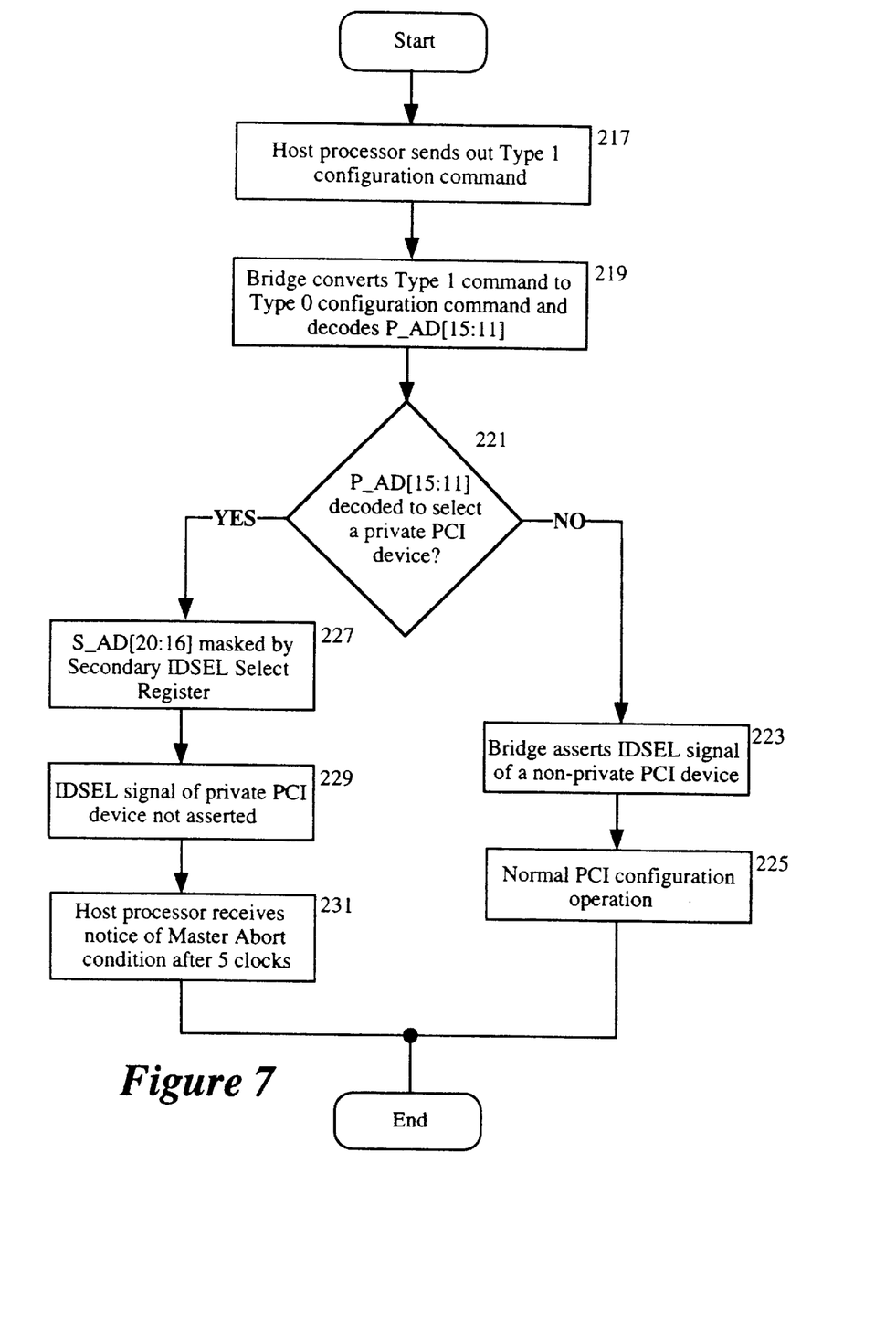
FIG. 7 is a flow diagram illustrating the operation of one embodiment of the I/O processor as it responds to configuration commands generated by a host processor.

FIG. 7 is a flow diagram illustrating the operation of I/O processor 5 as it responds to configuration commands generated on primary PCI bus 7 by host processor 3. FIG. 7 is a detailed description of block 215 of FIG. 6. Thus, FIG. 7 illustrates the operation of host processor 3 configuring PCI devices after local processor 21, bridge 29, primary ATU 23 and secondary ATU 27 have initialized.

In block 217, host processor 3 sends out a Type 1 configuration command directed towards bridge 29. It is typical procedure for processors to find all the devices in its environment and load software drivers to control these devices. Host processor 3 will thus try to find all PCI devices on secondary PCI bus 15 by going through bridge 29. Host processor 3 will send a Type 1 command for every address from P_AD[15:11]=$00000_2$ to P_AD[15:11]=$11111_2$. Alternatively, host processor 3 will stop at P_AD[15:11]=$01111_2$ as, according to Table 1, there will not be any bits in S_AD[31:11] that will be asserted after P_AD[15]=1.

In block 219, bridge 29 of I/O processor 5 will convert the Type 1 configuration command received on primary PCI interface 33 from host processor 3 to a Type 0 configuration command. As part of the conversion, bridge 29 will decode P_AD[15:11] according to Table 1.

Referring to block 221, if there were no private PCI devices created by I/O processor 5 during its initialization as explained by the flow diagram in FIG. 6, operation would continue with block 223, where bridge 29 would assert the IDSEL signal of the device attached to the corresponding secondary address S_AD[31:16] and continue with normal PCI configuration operations in block 225. However, if private PCI devices were created during the initialization process of I/O processor 5 as illustrated by FIG. 6, where the private PCI devices were created by using SISR 75 as explained by FIG. 3b and 3c, operation would continue with block 227.

In block 227, where private PCI devices have been created by using any one of bits [4:0] of SISR 75, P_AD[15:11] has been decoded to assert a bit in S_AD[20:16] which corresponds to the IDSEL of a private device. However, that bit will be deasserted as it is masked by the appropriate bit in bits [4:0] of SISR 75, as seen in Table 2. For example, referring again to FIG. 4c and Table 2, if PCI device 123 has been made private during initialization of I/O processor 5 by setting bit[1] of SISR 75 and P_AD[15:11] decodes to assert bit S_AD[17], then bit S_AD[17] will be masked to zero by bit [1] of SISR 75.

In block 229 and continuing to refer to FIG. 3c, bridge 29 will not assert the IDSEL line of private PCI device 61 as bit S_AD[17] has been masked to zero by bit [1] of SISR 75.

In block 231, host processor 3 will receive a Master Abort condition from bridge 29 after 5 PCI clock cycles after FRAME#. Host processor 3 will then continue its normal configuration procedures.

Private PCI devices, once created, still need to be configured. Referring again to Local processor 21 is capable of internally generating Type 0 read and write commands on secondary PCI interface 35 that are not originally initiated as Type 1 commands on primary PCI bus 7. These Type 0 commands are required to configure private PCI devices on secondary PCI bus 15 which are in private PCI address space. Any device mapped into this private address space will NOT be part of the standard secondary PCI address space and therefore will not be configured by the system host processor. These devices are hidden from PCI configuration software but are accessible by using secondary ATU 27. The Type 0 configuration reads and writes can be generated by the Address Translation Unit.

Secondary outbound configuration cycles are used to support private PCI devices. The outbound ATU's provide a port programming model for outbound configuration cycles. Performing an outbound configuration cycle to either primary PCI bus 7 or secondary PCI bus 15 involves up to two local bus cycles:

1) Writing SOCCAR 99 with the PCI address used during the configuration cycle. See PCI Local Bus Specification, Revision 2.0, for information regarding configuration address cycle formats. This local processor cycle enables the transaction.

2) Writing or reading SOCCDR 101. This local processor cycle initiates the transaction. A read will cause a configuration cycle read to secondary PCI bus 15 with the address that is in SOCCAR 99. A write will similarly initiate a configuration cycle write to secondary PCI bus 15 with the write data from the second processor cycle.

Configuration cycles are non-burst and restricted to a single word cycle. Local processor burst writes to either primary ATU 23 or secondary ATU 27 would be ignored and burst reads would return FFFF.FFFF$_H$ for data words after the first.

What is claimed is:

1. An apparatus comprising:

means for writing a first configuration register in a bus bridge coupled to said apparatus to disable the assertion by a first component on a first component bus of a component select signal on a second component bus;

means for writing a second configuration register in said bus bridge to disable a propagation by said bus bridge of a private address contained in an address space which is private to said secondary component bus from said second component bus to said first component bus: and, means for writing a third configuration register in an address translation unit coupled to said apparatus such that said address translation unit will translate said private address to a local system address in a local system address space and also translate a local system address contained in said local system address space to said private address.

2. An apparatus comprising:

a first interface for coupling to a first component bus;

a second interface for coupling to a second component bus;

an address translation unit coupled to said second interface; and a bus bridge coupled to said first interface and to second interface and having a first configuration register for disabling an assertion by a first component coupled to said first interface of a component select signal on said second interface, a second configuration register for disabling a propagation by said bus bridge of a private address contained in an address space which is private to said second interface from said second interface to said first interface and to disable a response by said bus bridge to said private address sent from said first interface, and a third configuration register in aid address translation unit such that said address translation unit will translate said private address to a local system address in a local system address space and also translate a local system address contained in said local system address space to said private address.

* * * * *

UNITED STATES PATENT AND TRADEMARK OFFICE
CERTIFICATE OF CORRECTION

PATENT NO.    : 5,848,249
DATED         : December 8, 1998
INVENTOR(S)   : Garbus et al.

It is certified that error appears in the above-identified patent and that said Letters Patent is hereby corrected as shown below:

Column 6,
Line 25, delete "S_AD[11]", insert -- S_AD[15:11] --.

Column 7,
Line 10, delete "000002 to 001002", insert -- $00000_2$ to $00100_2$ --.
Line 64, "S_AD[1]", insert -- S_AD[19] --.

Column 12
Line 6, delete "P AD", insert -- P_AD --.

Signed and Sealed this

Twenty-third Day of December, 2003

JAMES E. ROGAN
*Director of the United States Patent and Trademark Office*